(12) United States Patent
Hellman et al.

(10) Patent No.: US 6,961,496 B2
(45) Date of Patent: Nov. 1, 2005

(54) OPTICAL PACKAGE WITH CASCADED FILTERING

(75) Inventors: Scott M. Hellman, Aliso Viejo, CA (US); Patrick B. Paolini, Irvine, CA (US); Paul A. Townley-Smith, Irvine, CA (US); Michael Ushinsky, Irvine, CA (US)

(73) Assignee: Avanex Corporation, Fremont, CA (US)

( * ) Notice: Subject to any disclaimer, the term of this patent is extended or adjusted under 35 U.S.C. 154(b) by 212 days.

(21) Appl. No.: 10/108,010

(22) Filed: Mar. 26, 2002

(65) Prior Publication Data

US 2003/0185513 A1    Oct. 2, 2003

(51) Int. Cl.⁷ .......................... G02B 6/26; G02B 6/32; G02B 6/36
(52) U.S. Cl. ................... 385/47; 385/33; 385/34; 385/79
(58) Field of Search .............. 385/27–28, 24, 385/31, 33–34, 79, 47; 359/341.1; 372/6

(56) References Cited

U.S. PATENT DOCUMENTS

| | | |
|---|---|---|
| 3,679,291 A | 7/1972 | Apfel et al. |
| 4,482,202 A | 11/1984 | Nagao |
| 5,264,909 A | 11/1993 | Rochester |
| 5,502,781 A | 3/1996 | Li et al. |
| 5,604,629 A | 2/1997 | Hunter et al. |
| 5,615,052 A | 3/1997 | Doggett |
| 5,619,605 A | 4/1997 | Ueda et al. |
| 5,652,814 A | 7/1997 | Pan et al. |
| 5,675,683 A | 10/1997 | Takahashi et al. |
| 5,682,452 A | 10/1997 | Takahashi |
| 5,692,081 A | 11/1997 | Takahashi |
| 5,737,104 A | 4/1998 | Lee et al. |
| 5,748,820 A | 5/1998 | Le Marer et al. |
| 5,768,458 A | 6/1998 | Ro et al. |
| 5,799,121 A | 8/1998 | Duck et al. |
| 5,917,626 A | 6/1999 | Lee |
| 5,982,547 A | 11/1999 | Someno et al. |
| 6,040,944 A * | 3/2000 | Pan et al. ................... 359/590 |
| 6,084,994 A | 7/2000 | Li et al. |
| 6,134,360 A | 10/2000 | Cheng et al. |
| 6,168,319 B1 | 1/2001 | Francis |
| 6,173,106 B1 | 1/2001 | DeBoynton et al. |
| 6,192,175 B1 | 2/2001 | Li et al. |
| 6,282,339 B1 | 8/2001 | Zheng |
| 6,322,256 B1 | 11/2001 | Inada et al. |

(Continued)

FOREIGN PATENT DOCUMENTS

EP          0 404 052        12/1993

(Continued)

OTHER PUBLICATIONS

Structural Analysis in Microelectronics and Fiber Optics—1997, pp. 34-54 of The Electrical and Electronic Packing Division, vol. 21.

(Continued)

*Primary Examiner*—Frank G. Font
*Assistant Examiner*—Michael P. Mooney
(74) *Attorney, Agent, or Firm*—Moser, Patterson & Sheridan LLP

(57) ABSTRACT

An optical package comprises an optical element (e.g., a filter), a reflective surface, an input optical fiber and an output optical fiber. A light signal travels through the input fiber and through the element where it is shaped or modified a first time. The shaped light signal is reflected by the reflective surface and is again transmitted through the element where it is shaped or modified a second time. The twice-shaped light signal then travels out through the output fiber. The package thereby utilizes the element two times. The package is useful in wavelength division multiplex (WDM) telecommunication systems and other light processing systems.

19 Claims, 3 Drawing Sheets

U.S. PATENT DOCUMENTS

| | | | |
|---|---|---|---|
| 6,343,166 B1 | 1/2002 | Hellman et al. | |
| 6,393,191 B1 | 5/2002 | Chen et al. | |
| 6,433,924 B1 | 8/2002 | Sommer | |
| 6,454,465 B1 | 9/2002 | Uschitsky et al. | |
| 6,477,289 B1 | 11/2002 | Li | |
| 6,577,789 B1 * | 6/2003 | Wang | 385/27 |
| 6,603,906 B2 * | 8/2003 | Qin et al. | 385/48 |
| 2002/0110322 A1 * | 8/2002 | Brun et al. | 385/33 |
| 2002/0118920 A1 * | 8/2002 | Francis et al. | 385/33 |

FOREIGN PATENT DOCUMENTS

| | | |
|---|---|---|
| EP | 0421 654 | 7/1994 |
| EP | 0 722 101 | 7/1996 |
| WO | WO 9302373 | 2/1993 |
| WO | WO 9612986 | 5/1996 |
| WO | WO 0163338 | 8/2001 |

OTHER PUBLICATIONS www.ma.man.ac.uk, May 23, 2001.

Fluent Incorporated Website, May 23, 2001.

W.J. Thomlinson, Applications of Grin-Rod Lenses in Optical Fiber Communications Systems, pp. 1127-1136, Apr. 1980.

Genady P. Cherepanov, On the Theory of Thermal Stresses in a Thin Bonding Layer, Journal Applied Physics, 1995, vol. 78,(11), pp. 6826,6832.

Richard J. Scheuerman, Deformation of Optical Surfaces by Film Stress, Journal of Vacuum Science and Technology, 1969, vol. 6, No. 1, pp. 145-147.

* cited by examiner

OPTICAL PACKAGE WITH CASCADED FILTERING

BACKGROUND OF THE INVENTION

1. Field of the Invention

The present invention relates to optical systems and, in particular, to an optical packaging design for optical filters, isolators and the like.

2. Technical Background

There is considerable interest in the field of optics, particularly relating to the area of telecommunication systems. Optical fibers are the transmission medium of choice for handling the large volume of voice, video, and data signals that are communicated over both long distances and local networks. Much of the interest in this area has been spurred by the significant increase in communications traffic which is due, at least in part, to the Internet. Important components of fiber optic networks are the optical filters concatenated into the wavelength division multiplexing (WDM) modules, optical isolators, and similar devices which modify, shape, and block light signals. These devices may be subjected to various thermal and mechanical stresses/during assembly, production, environmental testing, and operations. It is critical to the operation of the network that these devices function reliably over their projected 20 to 25 year service life. Further, these devices represent a significant portion of the cost of a network. Therefore, it is desirable to reduce the cost of these important components.

An example of a typical filter device is illustrated schematically in FIG. 1. The device functions as follows. A light signal 11a travels through optical fiber 12a which is positioned in a capillary of input glass ferrule 13a. The signal 11a exits the fiber 12a and travels through input collimating lens 14a where the signal is collimated into parallel rays and directed to thin film filter 15b which is deposited on a glass substrate 15a. Filter 15b modifies the light signal 11 as the signal travels through filter 15b. The signal 11 then travels through the output collimating GRIN lens 14b where the signal is directed to the output fiber 12b.

The typical filter package is further illustrated in the cross-section view of FIG. 2. In addition to the components shown in FIG. 1, there is shown the insulating glass sleeves 21a and 21b, metal sleeves 22a and 22b, outer metal enclosure 23, and solder or weld joints 24a and 24b.

While these packages can function well, there are two areas which must be continually improved upon. These are cost and reliability. These devices continue to be expensive due to the numerous parts required and the high cost of some components. As can be seen in the figures, the device has multiple identical components. For example, there are two ferrules 13a and 13b, two collimating GRIN lenses 14a and 14b, two insulating glass sleeves 21a and 21b, two metal sleeves 22a and 22b, and two solder or weld joints 24. All of these components are not only costly, but they also result in time and labor costs to assemble these precision devices. Further, an increased number of components generally reduces yield while increasing the failure rate. Of particular concern are the solder or weld joints 24 which create a hermetic or near hermetic seal for the device. If either one of these joints 24 fail, it increases the chance of a device failure. Also, the most significant cost of the device is the filter element itself. A single filter may cost several hundred dollars. A device, system, or method to reduce the costs and improve reliability would be a significant advantage.

Finally, any package design should be adequate not only to mechanically protect the fragile optical components but also to compensate for and minimize the thermally induced shift in spectral performance.

The continuing goal, therefore, is to find ways to reduce costs and improve quality and reliability of optical filtering packages. It is also a goal to design a package that is simple in construction and miniaturized.

SUMMARY OF THE INVENTION

To address the goals stated above, the inventive optical package increases reliability and reduces cost, labor, and size. The invention achieves these goals by significantly reducing the parts required to make an optical package. The invention eliminates the need for half of the collimating GRIN lenses, half of the glass ferrules, half of the insulating sleeves, half of the metal sleeves, and half of the solder or weld joints. In addition, the innovative design reduces the size of the package by approximately one half and also reduces the cost of filters used in the package for some applications.

The invention achieves these reductions using a new design which includes an optical filter film and a reflective coating deposited on a substrate. A light signals enters the package through an input fiber. The light signal impinges on the filter where it is spectrally shaped or modified. A portion of the signal passes through the filter and is reflected by the reflector. The signal then passes back through the filter a second time where it is spectrally shaped or modified again. The shaped signal exits the package through the output fiber. Using this design, both the incoming light signal and the outgoing light signal travel through virtually the same components and thereby eliminate the need for the output collimating lens 14b, glass ferrule 13b and surrounding insulating and encapsulating components of FIG. 2. When passed twice through the same thin film coating the spectral function of the output light signal becomes steeper. This allows the use of a cheaper filter. For example, it is possible to use a 4-cavity system instead of a 5-cavity system.

The invention achieves the reduced component count by depositing a reflective coating onto the filter substrate and adding a capillary to the input glass ferrule. Both of these changes are low cost modifications.

In addition, only one solder or weld joint is needed. The new outer metal sleeve has one closed end and one open end, therefore only the open end needs to be hermetically sealed with solder or weld. This is a significant advantage for increasing manufacturing yield and product reliability since the operation of soldering and welding is a high-risk operation. The high temperatures associated with soldering or welding induce thermal mismatch stress, or in the glass optical components and insulating and encapsulating units. These stressed cause the repositioning of optical components, lowering its optical and mechanical performance, and even resulting in possible damage to the delicate components. In addition, the solder, flux or weld material may contaminate optical components. The invention reduces the risk associated with these factors by reducing the number of solder or weld joints.

Another advantage is reduced cost of the filter. Optical filters often comprise four to ten dozen layers of dielectric films deposited onto a substrate. The cost of the filter increases non-linearly with the number of layers. Put another way, a filter requiring 100 layers costs more than twice as much as a filter requiring only 50 layers. Using the invention, a 50 layer filter can perform the function of a 100 layer filter since the light signal passes through the filter twice. This significantly reduces filter cost. Moreover, the low-cavity filters having limited applications in the transmitted (prior-art) devices, can be used to replace a better performing and more expensive higher-cavity systems. In another aspect, the reflector is a diffraction grating type that splits the incoming light signal into several reflected signals of different wavelengths.

It is clear that the invention is a significant improvement over the prior art. Further, those skilled in the art recognized that the invention is not limited to use with optical filters. Other optical devices, such as isolators, may also be used in the invention.

Additional features and advantages of the invention will be set forth in the detailed description which follows, and in part will be readily apparent to those skilled in the art from that description or recognized by practicing the invention as described in the detailed description which follows, the claims, as well as the appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated in and constitute part of this specification. The drawings illustrate various features and embodiments of the invention which, together with their description serve to explain the principals and operation of the invention.

DETAILED DESCRIPTION OF THE PREFERRED EMBODIMENT

Figure 1:
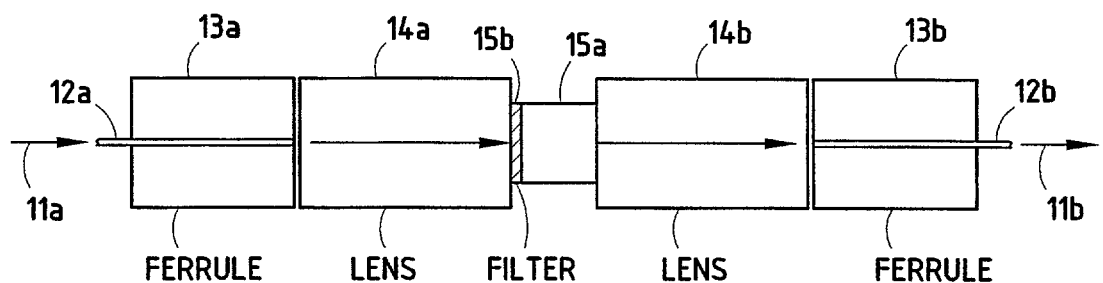
FIG. 1 is a schematic diagram of a prior art filter package.
Figure 2:
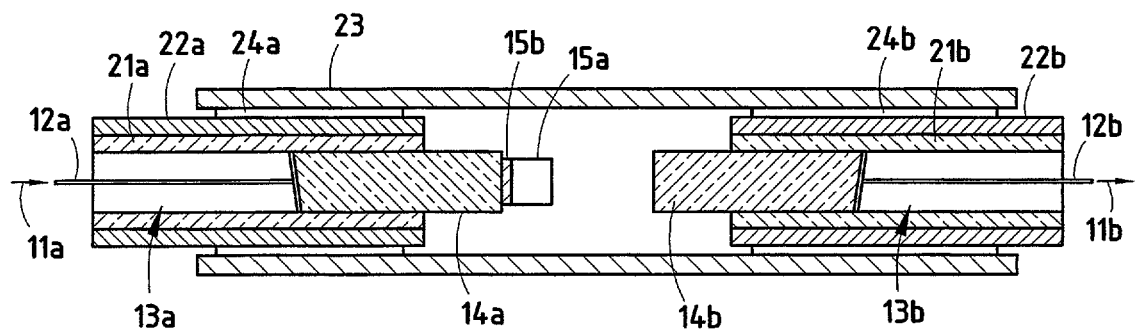
FIG. 2 is a cross-section view of a prior art filter package.

Reference will now be made in detail to the present preferred embodiments of the invention, examples of which are illustrated in the accompanying drawings. Wherever possible, the same reference numerals will be used throughout the drawings to refer to the same or like parts.

Figure 3:
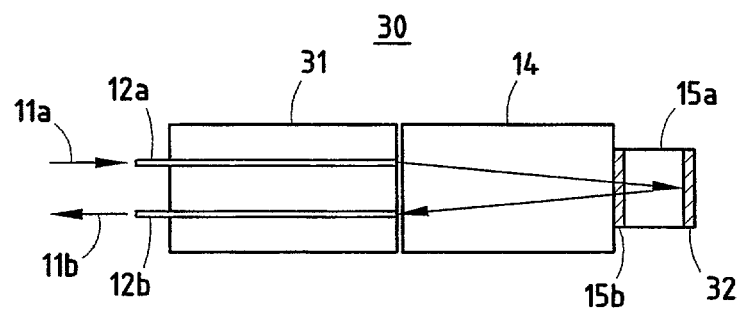
FIG. 3 is a schematic diagram of the preferred embodiment of the invention.

An exemplary embodiment of the package of the present invention is shown in FIG. 3, and is designated generally throughout by reference numeral 30.

The invention will first be described referring to a schematic diagram and then referring to a cross-section view of the preferred embodiment. The most common use for the invention is as a component in a telecommunications network and therefore the following discussion will describe the invention in relation to a telecommunications application.

Referring first to FIG. 3 there is shown a schematic diagram of the invention. A light signal 11a enters the package 30 through input optical fiber 12a. Light signal 11 is preferably a conventional optical signal having wavelengths in, for example the C-band or possibly in the S-band or L-band. Optical fibers 12 are preferably conventional single mode optical fibers commonly used in telecommunications applications. Fibers 12 are stripped of their polymer coating, positioned inside the capillaries of glass ferrule 31 and epoxy bonded. The end face of the formed fiber-ferrule is polished to 8° and coated with an anti-reflection (AR) coating.

Light signal 11a exits input fiber 12a and enters collimating lens 14 which directs the light beams to optical filter 15b. Lens 14 is preferably a graded index (GRIN) collimating lens. Light signal 11a is spectrally modified by filter 15a. Filter 15b is preferably a gain-flattening filter (GFF) similar to the type of filter commonly used in combination with an optical amplifier. However, the invention is also useful with other types of filters and optical elements. The spectrally modified light signal next passes through the transparent substrate 15a which is preferably glass. The filter 15b is deposited on the first surface of substrate 15a in a conventional manner.

A reflective coating is deposited on the second surface of substrate 15a and forms reflector 32. Reflector 32 is comprised of a metal coating, refractive film or reflection grating suitable for reflecting the wavelengths of interest. Note that glass substrate is wedged (approximately 1.5–2.5°) to provide the coupling of the reflected wavelength of choice to output fibers and to discriminate the other wavelength.

The modified light signal is reflected by reflector 32 and is transmitted back through substrate 15a and through filter 15b where it is again spectrally modified. The twice modified light signal 11b is then transmitted back through GRIN lens 31 to output optical fiber 12b which guides the light signal 11b to the communications network.

A benefit of the invention is that the light signal 11 is transmitted through filter 15b two times. Therefore, a filter comprising fewer number of dielectric films may perform the desired higher order gain flattening operation. Consequently, the filter 15b should be less expensive. The preferred embodiment will now be discussed in relation to a cross-section view.

Figure 4:
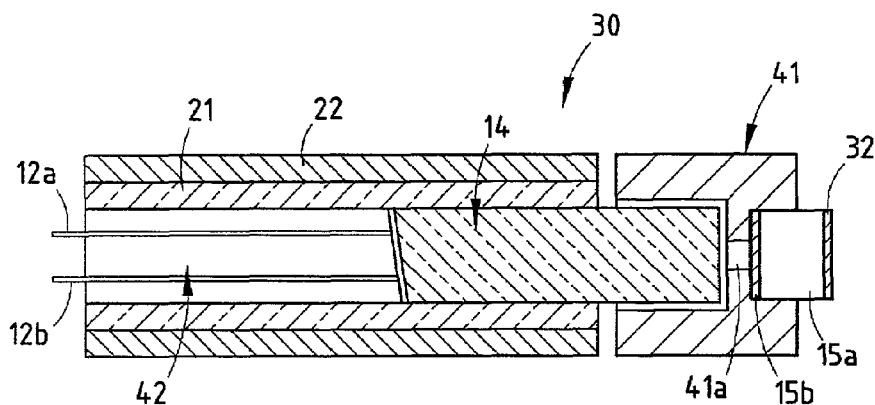
FIG. 4 is a cross-section view of the preferred embodiment of the invention.

FIG. 4 is a cross-section view of the preferred embodiment. In addition to the elements described in FIG. 3, there is shown the insulating glass sleeve 21, metal sleeve 22, and filter holder 41. The package is assembled as follows.

The dual-capillary glass ferrule 42 and collimating GRIN lens 14 are embedded into insulating glass tube 21, which is protected by a metal, glass, or ceramic sleeve 22. The optical path consists of two (input and output) optical glass fibers 12a and 12b inserted and bonded into the ferrule 42 to produce a fiber-ferrule sub-assembly, a collimating (GRIN or aspheric) lens 14, and a spectral shaping GFF 15b on the first surface of substrate 15a. Lens 14 and fiber-ferrule 42 are sequentially positioned and have matching-angle polished 8 degree facets. The lens 14 collimates the light emitted from the input optical fiber 11a into parallel rays, which impinge upon the filter 15b. The filter 15b splits the collimated light into two beams. One beam is spectrally modified (shaped) in the filter refractive films then reflected from the reflective coating 32 back to the filter refractive films, where they are again spectrally shaped and finally coupled through the lens 14 into the output optical fiber 11b. The second light beam split by the filter 15b is reflected by filter 15b. The second beam is generally of no interest and is absorbed by the components of the package or transmitted through it in the case of the glass enclosure. However, it is possible to direct this second beam to a second output fiber if there is a desire to conserve the signal. The optical components are assembled and aligned, so the reflected light beam or signal is collimated and insertion loss (IL) is minimized.

Structural design and bonding are important factors affecting optical performance of fiber ferrules. Therefore, the preferred ferrule 42 comprises a pair of capillaries that allow stripped fibers (i.e. core and cladding only) to be inserted and positioned symmetrically and in parallel inside the ferrule 42. The ferrule 42 is positioned on an axis with the lens 14 such that lengths of the input and output optical paths are nearly equal.

The inserted fibers 11 are epoxy bonded inside the capillaries using heat-curable adhesive. The adhesive preferably has high Young's modulus (E>100,000 psi), moisture-resistance, bond thickness about 1–2 $\mu$m, and moderate-to-high thermal expansion coefficient ($\alpha$=40–60 $10^{-6}$ per degrees Celsius). A suitable product is 353ND EPO-TEK epoxy adhesive available from Epoxy Technology, Billerica, Mass.

Once prepared, the fiber-ferrule 42 is aligned and assembled with the lens 14. The end-face surfaces of lens 14 and fiber-ferrule 42 are coated with an anti-reflection (AR) film. Both the ferrule 42 and lens 14 are axially aligned and bonded to the interior of insulating glass sleeve 21, which is in turn bonded inside metal sleeve 22.

The GFF filter 15b comprises a plurality of dielectric films with a high refractive index and, adjacent to the substrate, a reflective metal or other dielectric coating or a reflection grating, to achieve cascaded filtering of the reflected light signal and to discriminate (if necessary) some wavelengths.

The filter 15b, along with the wedged (approximately 1.5–2.5°) substrate 15a, is bonded to filter holder 41. Filter holder 41 may be either metal (shown in FIG. 4) or glass (shown in FIG. 7). In the case of a tubular glass filter holder, the holder glass should be UV- and IR-transparent and thermally matching the lens glass. The filter 15b is bonded to the end-face of holder 41. In other words, its coefficient of thermal/expansion should be about $9\times10^{-6}$ or $10\times10^{-6}$. Both UV and heat-curable epoxy adhesives may be used in this bond. The bond thickness is preferably maintained and limited to 4–6 $\mu$m. A UV/heat-curable, low-shrinkable and high-modulus adhesive with a coefficient of thermal expansion close to the lens glass and glass holder is preferred to bond the filter holder 41 with the lens 14. To cure the adhesive inside a UV transparent glass holder, the UV light is guided and transmitted to the bond lines through the lateral surface of the holder 72 (in FIG. 7). To cure the adhesive inside a metal glass holder, the UV light is transmitted through slots or apertures formed in the side of the holder to allow UV light to enter. The duration of the UV exposure is inversely proportional to the minimal transmissivity of the glass holder on the G, H, and I bands of the UV spectrum of a mercury lamp.

Highly expandable glasses (e.g. WG 320 or typical GRIN lens glass), moderately expandable alloys (e.g. 17-4 PH stainless steel), and a low-expandable adhesive filled with highly concentrated particles (e.g. EMI 3410 epoxy adhesive containing UV and heat-sensitive curing initiators available from Electronic Materials, Inc., of Breckenridge, Colo.) form an appropriate combination of materials for the lens 14, holder 41 and adhesives.

The adhesive for securing both the filter 15b to the filter holder 41 and for securing the holder 41 to the GRIN lens 14 should be thermally matched. A low-shrinkable and high-modulus adhesive, such as EMI 3410, with a coefficient of thermal expansion matching the adherent glass substrate 15a and metal holder 41, is used to minimize the mismatched stresses in these bonds. The glass filter 15b, including the glass substrate 15a, is bonded to the metal holder 41, which includes an aperture 41a through the center for the passage of light. The filter 15b (including substrate 15a) is positioned into the holder 41 and the filter 15b is bonded to the holder 41. The filter holder 41 includes a lens aperture that telescopically overlaps the cylindrical GRIN lens 14 leaving sufficient space to allow for micro-tipping (approximately 2.5°) of the holder 41 relative to the lens 14 if active alignment is required. The holder 41 therefore has two opposite flat surfaces. The first one is perpendicular to the axis of the lens 14 and interfaces with the frontal face of the lens 14. The opposite surface, which interfaces and bonds with the filter 15b, is machined with a suggested tilt not exceeding about 2 degrees from the perpendicular to the axis of the GRIN lens 14. This allows reducing the total tilt of the holder 41 to achieve optical alignment. Another purpose for the tilting of the filter 15b is to achieve the desired filtering characteristic according to the filter's desired angle of incidence (AOI).

A simpler, but less accurate, method of mounting the filter 15b is to eliminate the filter holder 41 and bond the filter 15b directly to the end face of the lens 14 with a thin layer of optically transparent adhesive.

Active alignment is preferred to minimize insertion loss. An alignment station allows for rotation of the filter holder 41 around the GRIN lens 14 and for tipping and tilting (tip-tilt) the filter 15b in two reciprocally perpendicular planes to the axis of the lens 14. When a desired alignment is achieved, the filter holder 41 is adhesively bonded to the lens 14 to retain the alignment.

Figure 5A:
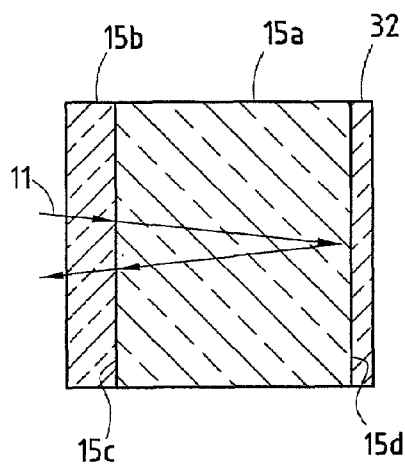
FIGS. 5A through 5E illustrate five configurations of filters and reflectors according to the invention.

Turning to FIGS. 5A through 5E there are illustrated various embodiments for configuring the filter 15b, the substrate 15a, and the reflector 32. FIG. 5A shows the preferred embodiment having the filter 15b deposited on the first surface 15c of substrate 15a. The reflective coating 32 is deposited on the second surface 15d of substrate 15a. The light signal 11 passes through filter 15b where it is spectrally modified or shaped a first time. The signal 11 is reflected by reflector 32 and then again passes through filter 15b where it is spectrally modified or shaped a second time. An advantage of this configuration is the relative ease of depositing filter 15b and reflector 32 on the surfaces of the substrate 15a.

Figure 5B:
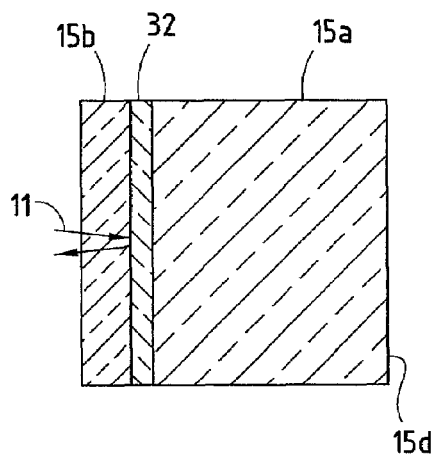

A second configuration is shown in FIG. 5B where both the reflector 32 and the filter 15b are both deposited on the first surface of the substrate. The reflector 32 is deposited on the substrate and next the layers of the filter 15b are deposited on top of the reflector 32. This configuration may be more difficult to implement due to the increased number of layers deposited on one surface and also has difficulties associated with the coupling.

Figure 5C:
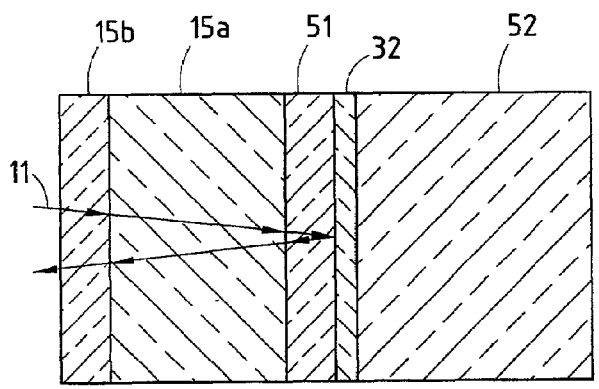

The third configuration uses two substrates and two filters and is illustrated in FIG. 5C. A first filter 15b is deposited on the first surface of the first substrate 15a. A second filter 51 is deposited on the second surface of substrate 15a. This may be useful if there are too many layers of dielectric material to be easily deposed on a single surface or if some layers do not adhere well to other layers. The reflector 32 is deposited on the first surface of the second substrate 52 and then bonded to the second filter 51 with a thin layer of optically transparent adhesive. Reflector 32 is preferably comprises gold or a gold alloy applied to a thickness of about 150 nm. However, those skilled in the art understand that other suitable reflective materials may also be used. This configuration also allows use of two differently performing commercial thin film filters.

Figure 5D:
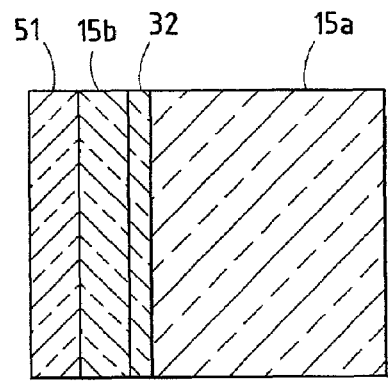

The fourth configuration deposits all filters and reflectors on the first surface of the first substrate 15a and is shown in FIG. 5D. The reflector 32 is first deposited onto the substrate 15a followed by the first filter 15b and finally the second filter 51 is deposited on top of the first filter 15b. This configuration may be preferred in some applications such as when the filters and reflector require a relatively small number of layers of films and coatings, but provide a small separation between the input and reflected beams.

Figure 5E:
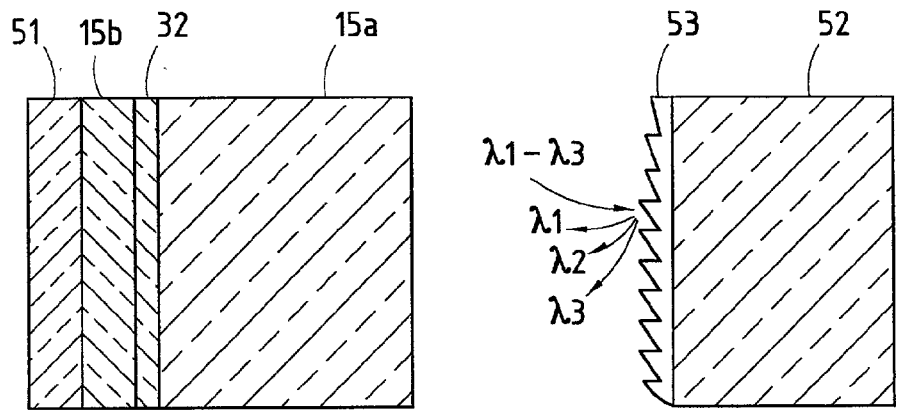

The configuration shown in FIG. 5E includes the reflection grating film 53 applied to the frontal surface of the second substrate 52. The gratings selectively reflect and split different wavelengths that can be coupled into the output optical fibers 12b. FIG. 5E illustrates this by showing an input signal of wavelengths $\lambda_1$–$\lambda_3$ that is split into three signals of wavelengths $\lambda_1$, $\lambda_2$, and $\lambda_3$. The three output signals are then coupled to three separate output optical fibers such as output optical fiber 12b. In this case, a multi-capillary ferrule can be used to separate and couple all reflected wavelengths. This ferrule should have separations between capillaries that provide thermally independent operations. First substrate 15a and second substrate 52 are illustrated by a gap for illustrative purposes only. Preferably first substrate 15a and grating 53 are bonded together.

As mentioned above in the summary, an advantage of the invention is that the filters modify or shape the light signal two times as opposed to only one time in the prior art. This allows either improved shaping or the use of less powerful and therefore less expensive filters to achieve the same results.

Figure 6:
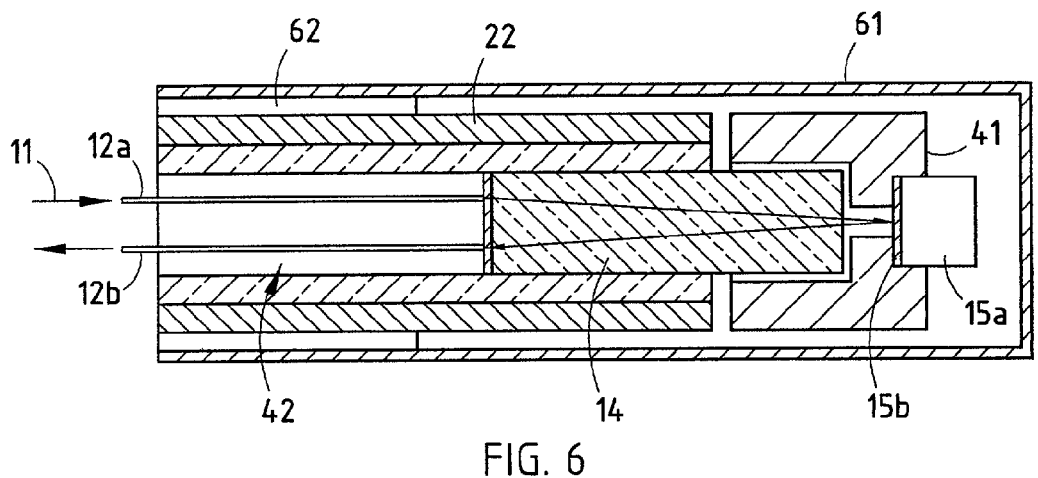
FIG. 6 is a cross-section view of a package embodied with a metal enclosure.
Figure 7:
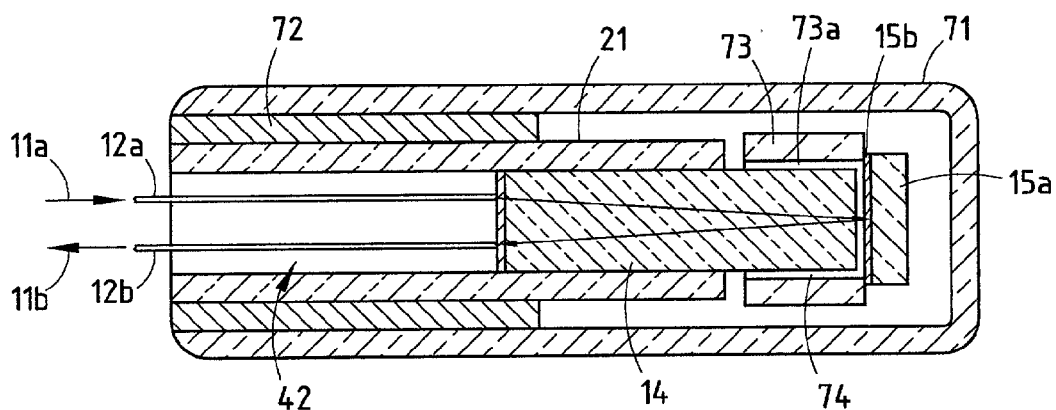
FIG. 7 is a cross-section view of a package embodied with a glass enclosure.

Referring now to FIGS. 6 and 7 there are two basic packaging techniques for encapsulation of the assembly shown in FIG. 4. The first technique is shown in FIG. 6. An outer metal enclosure 61 houses the assembly from FIG. 4. A low-temperature solder 62 is used to encapsulate the metal sleeve 22 to the interior of the metal enclosure 61. The assembled and soldered ferrule 42, GRIN lens 14, insulating glass tube 21, and metal enclosure 61 experience residual thermal stresses due to the contraction mismatch of the materials used. In order to minimize and maintain these stresses, a high compliance bond is suggested and an RTV silicone adhesive, such as DC 577 or CV 32000, may be used. As shown in FIG. 6, the length of the solder pool is limited to 50% of the length of the metal sleeve 22. This prevents chemical (through flux) and thermal conduction contamination of the filter and minimizes repositioning of the GRIN lens 14 and filter 15b due to thermal stresses. Since only one end of the package is soldered, this near hermetic package may have twice the reliability of prior art packages.

The assembly of FIG. 4 may also be bonded inside a tubular UV-transmissible glass enclosure having a fused or closed end as shown in FIG. 7. In this embodiment the thermally matching glass enclosure 71 is bonded with adhesive 72 to the insulating glass sleeve 21 and the metal sleeve 22 previously shown in FIG. 4 is not needed. An adhesive such as EMI 3410 is a suitable choice. The ferrule 42 and lens 14 assembly is inserted into the glass enclosure and UV "tacked" to hold the positions. A final heat cure secures the assembly inside of the glass enclosure 71.

The glass filter holder 73 is preferably formed form a glass tube or rod and has a closed end for bonding to the filter 15b and substrate 15a. Glass holder 73 also has a lens aperture 73a of sufficient dimensions to fit over lens 14 and allow for micro-tilting of the holder 73. Filter 15b is bonded to holder 73 with a thin layer of optically transparent adhesive 74. With this solution, the filter holder 73 can be made from a glass that thermally matches the glass of the GRIN lens 14. This solution provides thermal compatibility of all component and enclosure units and substantially reduces the mismatch stresses. The UV and IR transparent tubular units also allow the unused wavelength to pass out of package and, therefore, improve its performance, particularly in the case of the reflected gratings.

In addition to the previously mentioned advantages, the enclosure materials used in the invention are inexpensive, the thermo-mechanical behavior of the materials is well understood and can be predictable. Finally, the package does not require higher precision machining than the prior art.

It will become apparent to those skilled in the art that various modifications to the preferred embodiment of the invention as described herein can be made without departing from the spirit or scope of the invention as defined by the appended claims.

The invention claimed is:

1. An optical filter package comprising: a first optical filter suitable for shaping a desired wavelength of light signal; an input optical fiber optically coupled to the filter; an output optical fiber optically coupled to the filter; a collimating lens positioned between said optical fibers and said filter; and a reflector suitable for reflecting the desired wavelength of light signal, the filter positioned between the fibers and the reflector such that a light signal transmitted through the input optical fiber, is transmitted through the filter, is reflected by the reflector, and is transmitted back through the filter to the output optical fiber, wherein the filter is a gain-flattening shaping filter.

2. An optical filter package comprising:
a first optical filter suitable for shaping a desired wavelength of light signal;
an input optical fiber optically coupled to the filter;
an output optical fiber optically coupled to the filter;
a collimating lens positioned between said optical fibers and said filter; and
a reflector suitable for reflecting the desired wavelength of light signal, the filter positioned between the fibers and the reflector such that a light signal transmitted through the input optical fiber, is transmitted through the filter, is reflected by the reflector, and is transmitted back through the filter to the output optical fiber, wherein the filter comprises a dielectric film.

3. An optical filter package comprising:
a first optical filter suitable for shaping a desired wavelength of light signal;
an input optical fiber optically coupled to the filter;
an output optical fiber optically coupled to the filter;
a collimating lens positioned between said optical fibers and said filter; and
a reflector suitable for reflecting the desired wavelength of light signal, the filter positioned between the fibers and the reflector such that a light signal transmitted through the input optical fiber, is transmitted through the filter, is reflected by the reflector, and is transmitted back through the filter to the output optical fiber, wherein the reflector comprises a metallic coating.

4. An optical filter package comprising:
a first optical filter suitable for shaping a desired wavelength of light signal;
an input optical fiber optically coupled to the filter;
an output optical fiber optically coupled to the filter;
a collimating lens positioned between said optical fibers and said filter;
a reflector suitable for reflecting the desired wavelength of light signal, the filter positioned between the fibers and the reflector such that a light signal transmitted through the input optical fiber, is transmitted through the filter, is reflected by the reflector, and is transmitted back through the filter to the output optical fiber; and at least one substrate that supports the filter and the reflector.

5. An optical package comprising:

an optical element suitable for processing a light signal;

an input optical waveguide optically coupled to said optical element;

an output optical waveguide optically coupled to said optical element;

a reflector suitable for reflecting a desired wavelength of light signal, the optical element positioned between the input waveguide and the reflector such that a light signal transmitted through the input optical waveguide, is transmitted through the optical element, is reflected by the reflector, and is transmitted back through the optical element to the output optical waveguide; and at least one substrate supporting said optical element and said reflector, said at least one substrate having a first side and a second side, wherein said optical element is deposited on said first side.

6. The optical package of claim 5 wherein the optical element is an isolator.

7. The optical package of claim 5 wherein the optical element is a filter.

8. The optical package of claim 7 wherein the filter is a shaping filter.

9. The optical package of claim 8 wherein the filter is a gain-flattening filter.

10. The optical package of claim 7 wherein the filter comprises at least one dielectric layer.

11. The optical package of claim 5 wherein said reflector is deposited on said second side.

12. The optical package of claim 5 further comprising a glass enclosure having an aperture for receiving a lens and said optical element, and wherein said optical element is positioned in said aperture of said glass enclosure.

13. An optical filter package comprising:

an optical filter suitable for shaping a desired wavelength of light signal;

an input optical fiber optically coupled to the filter;

an output optical fiber optically coupled to the filter;

a reflector suitable for reflecting the desired wavelength of light signal, the filter positioned between the fibers and the reflector such that a light signal transmitted through the input optical fiber, is transmitted through the filter, is reflected by the reflector, and is transmitted back through the filter to the output optical fiber; and at least one substrate having a first surface and a second surface, wherein the filter is supported on the first surface and the reflector is supported on the second surface.

14. An optical filter package comprising:

an optical filter suitable for shaping a desired wavelength of light signal;

an input optical fiber optically coupled to the filter;

an output optical fiber optically coupled to the filter;

a reflector suitable for reflecting the desired wavelength of light signal, the filter positioned between the fibers and the reflector such that a light signal transmitted through the input optical fiber, is transmitted through the filter, is reflected by the reflector, and is transmitted back through the filter to the output optical fiber; and at least one substrate having a first surface and a second surface, wherein the reflector is deposited on the first surface and the filter is deposited on the reflector.

15. An optical filter package comprising:

a first optical filter and a second optical filter suitable for shaping a desired wavelength of light signal;

an input optical fiber optically coupled to the filters;

an output optical fiber optically coupled to the filters;

a reflector suitable for reflecting the desired wavelength of light signal, the filters positioned between the fibers and the reflector such that a light signal transmitted through the input optical fiber, is transmitted through the filters, is reflected by the reflector, and is transmitted back through the filters to the output optical fiber; and at least one substrate that supports the filters and the reflector, the at least one substrate having a first surface and a second surface, wherein the first filter is supported on the first surface and the second filter is supported on the second surface.

16. An optical filter package comprising:

an optical filter suitable for shaping a desired wavelength of light signal;

an input optical fiber optically coupled to the filter;

an output optical fiber optically coupled to the filter;

a reflector suitable for reflecting the desired wavelength of light signal, the filter positioned between the fibers and the reflector such that a light signal transmitted through the input optical fiber, is transmitted through the filter, is reflected by the reflector, and is transmitted back through the filter to the output optical fiber; and at least one substrate that supports the filter and the reflector, wherein the at least one substrate that supports the reflector has an angled surface such that the reflector is not parallel to the filter.

17. An optical filter package comprising:

a first optical filter suitable for shaping a desired wavelength of light signal;

an input optical fiber optically coupled to the filter;

an output optical fiber optically coupled to the filter;

a reflector suitable for reflecting the desired wavelength of light signal, the filter positioned between the fibers and the reflector such that a light signal transmitted through the input optical fiber, is transmitted through the filter, is reflected by the reflector, and is transmitted back through the filter to the output optical fiber; and a glass filter holder, the holder comprising a lens aperture for receiving the lens and a surface opposite the aperture for mounting the filter, the aperture of sufficient dimensions to allow micro tilting of the holder relative to the lens.

18. An optical package comprising:

an optical element suitable for processing a light signal;

an input optical waveguide optically coupled to said optical element;

an output optical waveguide optically coupled to said optical element;

a reflector suitable for reflecting a desired wavelength of light signal, the optical element positioned between the input waveguide and the reflector such that a light signal transmitted through the input optical waveguide, is transmitted through the optical element, is reflected by the reflector, and is transmitted back through the optical element to the output optical waveguide; and at least one substrate supporting said optical element and said reflector wherein one of said substrates comprises an angled surface supporting said reflector, said angled surface being at an angle relative to a plane parallel to the optical element.

19. An optical package comprising:

an optical element suitable for processing a light signal;

an input optical waveguide optically coupled to said optical element;

an output optical waveguide optically coupled to said optical element;

a reflector suitable for reflecting a desired wavelength of light signal, the optical element positioned between the input waveguide and the reflector such that a light signal transmitted through the input optical waveguide, is transmitted through the optical element, is reflected by the reflector, and is transmitted back through the optical element to the output optical waveguide; and a collimating lens positioned between said input waveguide and said optical element, and a glass optical element holder supporting said optical element, said holder comprising a lens aperture having dimensions sufficient to allow micro tilting of said holder relative to said lens.

* * * * *